United States Patent
DeCusatis et al.

(10) Patent No.: US 10,484,518 B2
(45) Date of Patent: *Nov. 19, 2019

(54) DYNAMIC PORT TYPE DETECTION

(71) Applicant: INTERNATIONAL BUSINESS MACHINES CORPORATION, Armonk, NY (US)

(72) Inventors: Casimer DeCusatis, Poughkeepsie, NY (US); Rajaram B. Krishnamurthy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,166

(22) Filed: Jan. 17, 2019

(65) Prior Publication Data

US 2019/0149639 A1    May 16, 2019

Related U.S. Application Data

(63) Continuation of application No. 15/283,483, filed on Oct. 3, 2016, now Pat. No. 10,230,825, which is a
(Continued)

(51) Int. Cl.
*G06F 15/177* (2006.01)
*H04L 29/06* (2006.01)
(Continued)

(52) U.S. Cl.
CPC .......... *H04L 69/22* (2013.01); *H04L 41/0809* (2013.01); *H04L 41/0823* (2013.01);
(Continued)

(58) Field of Classification Search
USPC ......... 709/220–226, 230–238; 370/231, 236, 370/394, 431, 462
See application file for complete search history.

(56) References Cited

U.S. PATENT DOCUMENTS

| 6,304,917 B1 | 10/2001 | Douceur et al. |
| 6,438,285 B1 | 8/2002 | DeCusatis et al. |
| (Continued) | | |

FOREIGN PATENT DOCUMENTS

| CN | 1753404 | 3/2006 |
| CN | 101197831 | 6/2008 |
| CN | 102118255 | 7/2011 |

OTHER PUBLICATIONS

"Dynamically configurable network router to support enterprise specific protocols," (2009) IBM Technical Disclosure, IP.com, IPCOM000182339D, pp. 1-4.
(Continued)

*Primary Examiner* — Younes Naji
*Assistant Examiner* — Da T Ton
(74) *Attorney, Agent, or Firm* — Cantor Colburn LLP; Steven Chiu

(57) ABSTRACT

A default mode of operation for a link is set at a server upon initialization. A wait pulse repetition time and number of supported modes of operation are set at the server. A protocol identifier is set to the default mode. A link initialization frame including the protocol identifier is transmitted to a port of a switch. Based on failing to receive a handshake response to acknowledge successful decoding of the protocol identifier from the switch prior to expiration of the wait pulse repetition time: the protocol identifier is changed to a next mode of operation, the wait pulse repetition time is reset, and the link initialization frame is transmitted to the port of the switch. Changing the protocol identifier, resetting the wait pulse repetition time, and transmitting the link initialization frame are repeated until the handshake response is received or all supported modes of operation are checked.

19 Claims, 8 Drawing Sheets

Related U.S. Application Data continuation of application No. 14/501,135, filed on Sep. 30, 2014, now Pat. No. 9,578,143, which is a continuation of application No. 13/833,798, filed on Mar. 15, 2013, now Pat. No. 9,571,610.

(51) Int. Cl.
  *H04L 12/24* (2006.01)
  *H04L 12/707* (2013.01)

(52) U.S. Cl.
  CPC .......... *H04L 41/0866* (2013.01); *H04L 45/24* (2013.01); *H04L 69/18* (2013.01)

(56) References Cited

U.S. PATENT DOCUMENTS

| | | | |
|---|---|---|---|
| 6,553,489 | B1 | 4/2003 | Osler et al. |
| 7,174,371 | B2 | 2/2007 | Elo et al. |
| 7,516,211 | B1 | 4/2009 | Gourlay et al. |
| 7,907,546 | B1* | 3/2011 | Prohofsky ........... H04L 49/3054 370/254 |
| 7,995,498 | B2 | 8/2011 | Andrews et al. |
| 8,024,482 | B2 | 9/2011 | Hoogerwerf et al. |
| 2003/0120852 | A1 | 6/2003 | McConnell et al. |
| 2005/0138258 | A1 | 6/2005 | Seto |
| 2006/0274774 | A1 | 12/2006 | Srinivasan et al. |
| 2007/0223517 | A1 | 9/2007 | Warren et al. |
| 2008/0189769 | A1 | 8/2008 | Casado et al. |
| 2008/0288664 | A1 | 11/2008 | Pettey et al. |
| 2010/0064065 | A1* | 3/2010 | Depta ................... G06F 3/0607 710/14 |
| 2010/0169523 | A1 | 7/2010 | Dunstan et al. |
| 2011/0289230 | A1 | 11/2011 | Ueno |
| 2014/0029451 | A1 | 1/2014 | Nguyen |
| 2014/0280791 | A1 | 9/2014 | Decusatis et al. |
| 2015/0019696 | A1 | 1/2015 | Decusatis et al. |

OTHER PUBLICATIONS

"Software Defined Networking," IBM Systems and Technology Thought Leadership White Paper, Oct. 2012, Retrieved from the internet: http://public.dhe.ibm.com/common/ssi/ecm/en/qcw03016usen/ on Feb. 6, 2013, 6 pages.

International Application No. PCT/IB2014/058897, International Search Report and Written Opinion dated May 23, 2014, 12 pages.

N. McKeown, et al., "OpenFlow: Enabling Innovation in Campus Networks," Mar. 14, 2008, Retrived from the internet: http://www.openflow.org on Jan. 29, 2013, 6 pages.

OpenFlow Switch Specification, Version 1.1.0 Implemented (Wire Protocol 0x02), Feb. 28, 2011, Retrieved from the internet: http://www.openflow.org on Jan. 29, 2013, 56 pages.

S. Doss, et al., "Method of Bandwidth Management by Dynamic Port Configuration," (1991) IBM Technical Disclosure Bulletin, 34(7A), IP.com, IPCOM000122446D, pp. 261-265.

* cited by examiner

DYNAMIC PORT TYPE DETECTION

DOMESTIC PRIORITY

This application is a continuation of and claims priority from U.S. application Ser. No. 15/283,483 filed Oct. 3, 2016, which claims priority from U.S. application Ser. No. 14/501,135 filed Sep. 30, 2014 and issued as U.S. Pat. No. 9,578,143, which claims priority from U.S. application Ser. No. 13/833,798 filed Mar. 15, 2013 and issued as U.S. Pat. No. 9,571,610, the entire contents of which are incorporated herein by reference.

BACKGROUND

The present invention relates to computer networks and, more specifically, to dynamic port type detection in a computer network.

Ethernet networks are typically employed in local area networks (LANs) that include a plurality of network switches. A number of communication protocols have been developed and continue to evolve to enhance Ethernet network performance for various environments. For example, an enhancement to Ethernet, called data center bridging (DCB), converged enhanced Ethernet (CEE) or data center Ethernet (DCE), supports the convergence of LANs with storage area networks (SANs). Other protocols that can be used in a data center environment in conjunction with Ethernet include, for instance, Fibre Channel over Ethernet (FCoE), Internet Wide Area Remote direct memory access Protocol (iWARP), Remote direct memory access over Converged Ethernet (RoCE).

Ports in contemporary network switches can auto-detect link data rates, assuming predefined protocol capabilities for each port. For example, data rate auto-detection as used in Ethernet involves determining the highest permitted data rate for the link and then adjusting port transmission rate accordingly. For data rate auto-detection to work properly, both ends of the link must recognize a request for maximum data rate capability and provide a response compatible with a predefined Ethernet protocol (e.g., a request/response protocol). However, this approach breaks down when multiple protocols are involved, as data rate auto-detection is typically protocol specific with assumed predefined protocol capabilities per port. Incorrect port attachments when integrating multiple protocols may not be detected by contemporary network switches, which can result in configuration errors that are difficult to isolate.

SUMMARY

According to an aspect of the present invention, a method for dynamic port type detection is provided. A default mode of operation for a link is set at a server upon server initialization. A wait pulse repetition time and a number of supported modes of operation are set at the server. A protocol identifier is set to the default mode of operation. A link initialization frame including the protocol identifier is transmitted to a port of a switch of a network. Based on failing to receive, at the server, a handshake response to acknowledge successful decoding of the protocol identifier from the switch prior to expiration of the wait pulse repetition time: the protocol identifier is changed to a next mode of operation selected from the supported modes of operation, the wait pulse repetition time is reset, and the link initialization frame is transmitted to the port of the switch. The changing of the protocol identifier, the resetting of the wait pulse repetition time, and the transmitting of the link initialization frame are repeated until the handshake response is received or all of the supported modes of operation are checked.

According to another aspect of the present invention, a system for dynamic port type detection is provided. The system includes a network controller, a server and a switch coupled to the network controller by a secure channel, where the switch includes a port coupled to the server by a link in a network. A default mode of operation for a link is set at the server upon server initialization. A wait pulse repetition time and a number of supported modes of operation are set at the server. A protocol identifier is set to the default mode of operation. A link initialization frame including the protocol identifier is transmitted to the port of the switch. Based on failing to receive, at the server, a handshake response to acknowledge successful decoding of the protocol identifier from the switch prior to expiration of the wait pulse repetition time: the protocol identifier is changed to a next mode of operation selected from the supported modes of operation, the wait pulse repetition time is reset, and the link initialization frame is transmitted to the port of the switch. The changing of the protocol identifier, the resetting of the wait pulse repetition time, and the transmitting of the link initialization frame are repeated until the handshake response is received or all of the supported modes of operation are checked.

According to a further aspect of the present invention, a computer program product for dynamic port type detection is provided. The computer program product includes a tangible storage medium readable by a processing circuit and storing instructions for execution by the processing circuit for performing a method. The method includes setting a default mode of operation for a link at a server upon server initialization. A wait pulse repetition time and a number of supported modes of operation are set at the server. A protocol identifier is set to the default mode of operation. A link initialization frame including the protocol identifier is transmitted to a port of a switch of a network. Based on failing to receive, at the server, a handshake response to acknowledge successful decoding of the protocol identifier from the switch prior to expiration of the wait pulse repetition time: the protocol identifier is changed to a next mode of operation selected from the supported modes of operation, the wait pulse repetition time is reset, and the link initialization frame is transmitted to the port of the switch. The changing of the protocol identifier, the resetting of the wait pulse repetition time, and the transmitting of the link initialization frame are repeated until the handshake response is received or all of the supported modes of operation are checked.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to dynamic port type detection in computer network switches. Upon detecting a particular network protocol received at a switch, switch ports can be initialized or re-initialized in a mode of operation to support the protocol from multiple possible supported protocols. For example, switch ports can be configured as Ethernet, Fibre Channel, FCoE, iWarp, RoCE, or other supported protocols on demand. Dynamic port type detection eliminates the need for a standalone gateway or hub to make network protocol specific adjustments. Dynamic port type detection may also facilitate virtualization and dynamic network provisioning.

In an exemplary embodiment, switches in a network are under the control of a central software-defined network (SDN) controller. An SDN is a form of network virtualization in which the control plane is separated from the data plane in the network and implemented in a software application. This architecture allows network administrators to have programmable central control of network traffic without requiring physical access to hardware devices of the network. OpenFlow is an example of an enabler of SDN that gives access to the forwarding plane of a network switch or router over the network. The central SDN controller can receive messages from all of the switches in the network and provide instructions to each switch regarding the creation of virtual queues and the routing of packet traffic. The central SDN controller overlooks an entire network and may activate a selection of switches at a particular moment in time.

Figure 1:
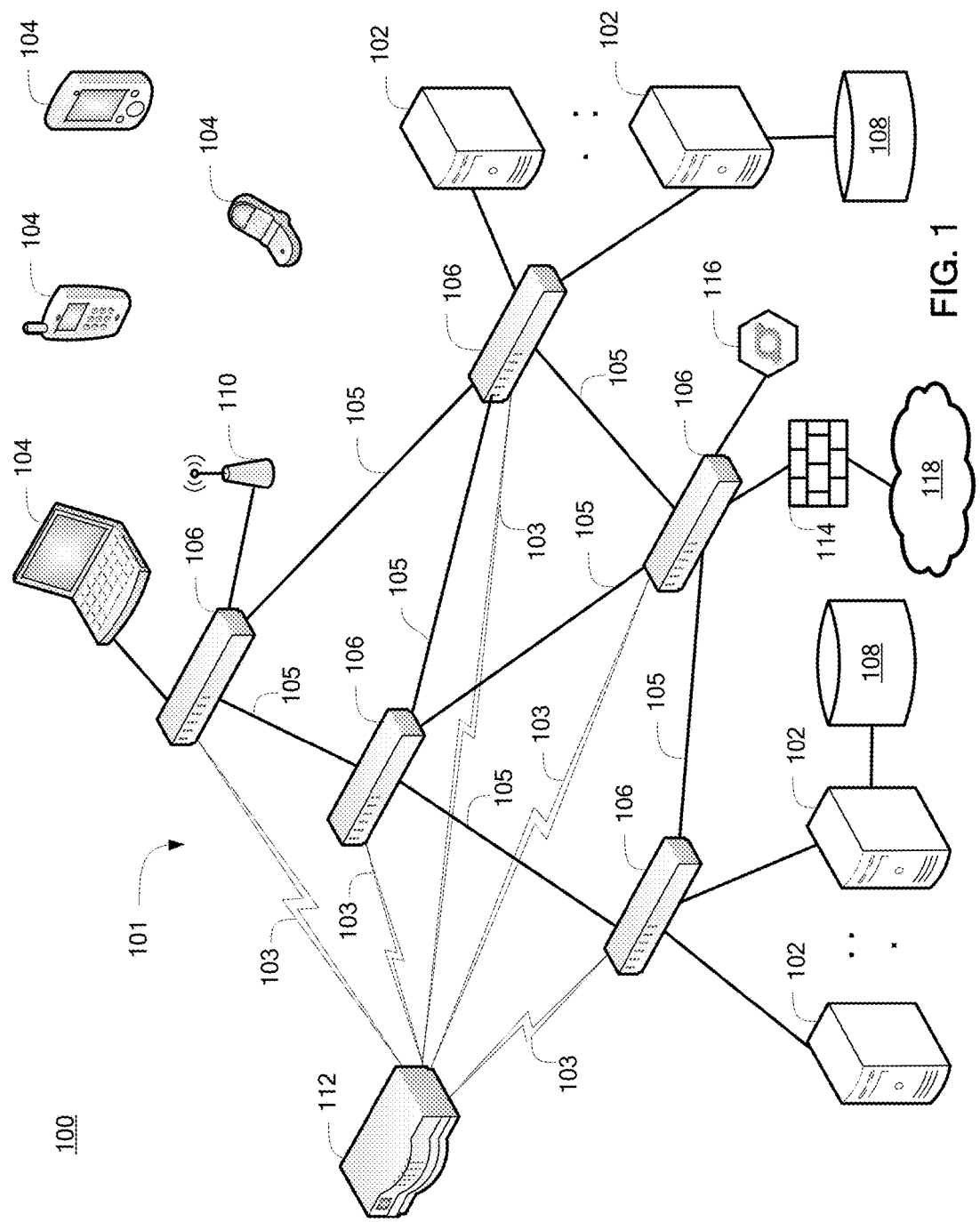
FIG. 1 depicts a block diagram of a system including a network with OpenFlow-capable switches that may be implemented according to an embodiment.

Turning now to FIG. 1, an example of a system 100 including a network 101 that supports OpenFlow will now be described in greater detail. In the example depicted in FIG. 1, the system 100 is a data center environment including a plurality of servers 102 and client systems 104 configured to communicate over the network 101 using switches 106 that are OpenFlow-capable. In exemplary embodiments, the servers 102, also referred as hosts or host systems, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 100. The servers 102 may be storage system servers configured to access and store large amounts of data to one or more data storage systems 108.

The client systems 104 can include a variety of desktop, laptop, general-purpose computer devices, mobile computing devices, and/or networked devices with processing circuits and input/output (I/O) interfaces, such as keys/buttons, a touch screen, audio input, a display device and audio output. The client systems 104 can be linked directly to one or more of the switches 106 or wirelessly through one or more wireless access points 110.

The data storage systems 108 refer to any type of computer readable storage media and may comprise one or more secondary storage elements, e.g., hard disk drive (HDD), solid-state memory, tape, or a storage subsystem that is internal or external to the servers 102. Types of data that may be stored in the data storage systems 108 include, for example, various files and databases. There may be multiple data storage systems 108 utilized by each of the servers 102, which can be distributed in various locations of the system 100.

The system 100 also includes a network controller 112 that is a central software defined network controller configured to make routing decisions within the network 101. The network controller 112 establishes secure links 103 to configure the switches 106 and establish communication properties of links 105 between the switches 106. For example, the network controller 112 can configure the switches 106 to control packet routing paths for data flows between the servers 102 and client systems 104, as well as one or more firewalls 114 and one or more load balancers 116. The one or more firewalls 114 restrict access and the flow of network traffic between the network 101 and one or more external networks 118. The one or more load balancers 116 can distribute workloads across multiple computers, such as between the servers 102.

The servers 102, client systems 104, and network controller 112 can include various computer/communication hardware and software technology known in the art, such as one or more processing units or circuits, volatile and non-volatile memory including removable media, power supplies, network interfaces, support circuitry, operating systems, and the like. Although the network controller 112 is depicted as a separate component, it will be understood that network configuration functionality can alternatively be implemented in one or more of the servers 102 or client systems 104 in a standalone or distributed format.

The network 101 can include a combination of wireless, wired, and/or fiber optic links. The network 101 as depicted in FIG. 1 represents a simplified example for purposes of explanation. Embodiments of the network 101 can include numerous switches 106 (e.g., hundreds) with dozens of ports and links per switch 106. The network 101 may support a variety of known communication standards that allow data to be transmitted between the servers 102, client systems 104, switches 106, network controller 112, firewalls(s) 114, and load balancer(s) 116. Communication protocols are typically implemented in one or more layers, such as a physical layer (layer-1), a link layer (layer-2), a network layer (layer-3), a transport layer (layer-4), and an application layer (layer-5). In exemplary embodiments, the network 101 supports OpenFlow as a layer-2 protocol. The switches 106 can be dedicated OpenFlow switches or OpenFlow-enabled general purpose switches that also support layer-2 and layer-3 Ethernet.

Figure 2:
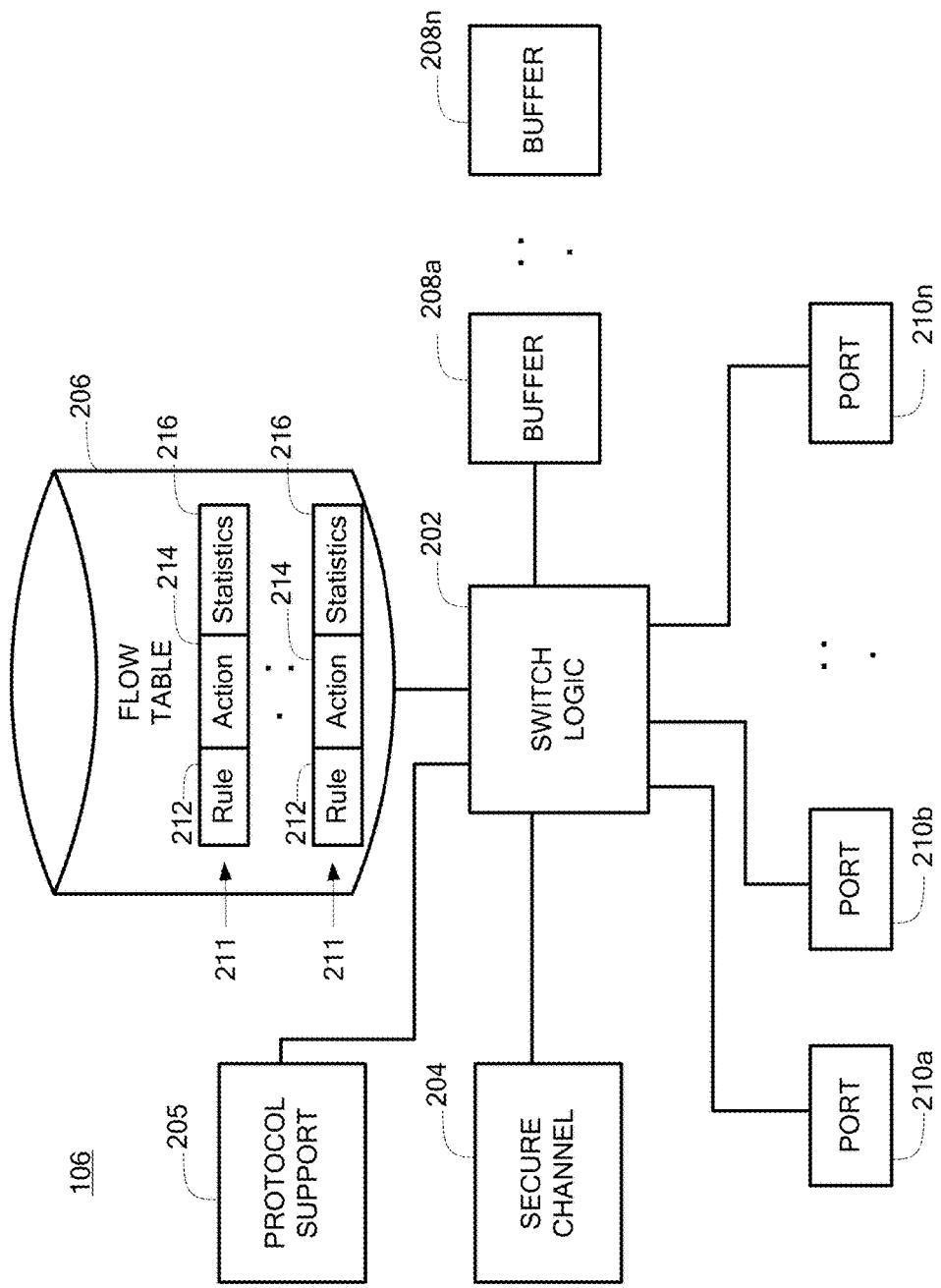
FIG. 2 depicts a block diagram of an OpenFlow-capable switch according to an embodiment.

FIG. 2 depicts a block diagram of the switch 106 of FIG. 1 that supports OpenFlow. The switch 106 includes switch logic 202, secure channel 204, protocol support 205, flow table 206, buffers 208a-208n, and ports 210a-210n. The switch logic 202 may be implemented in one or more processing circuits, where a computer readable storage medium is configured to hold instructions for the switch logic 202, as well as various variables and constants to support operation of the switch 106. The switch logic 202 forwards packets between the ports 210a-210n as flows defined by the network controller 112 of FIG. 1.

The secure channel 204 connects the switch 106 to the network controller 112 of FIG. 1. The secure channel 204 allows commands and packets to be communicated between the network controller 112 and the switch 106 via the OpenFlow protocol. The secure channel 204 can be implemented in software as executable instructions stored within the switch 106. Protocol details to establish a protocol definition for an implementation of OpenFlow and other protocols can be stored in the protocol support 205. The protocol support 205 may be software that defines one or more supported protocol formats. The protocol support 205 can be embodied in a computer readable storage medium, for instance, flash memory, which is configured to hold instructions for execution by the switch logic 202. Implementing the protocol support 205 as software enables updates in the field for new versions or variations of protocols and can provide OpenFlow as an enhancement to existing conventional routers or switches.

The flow table 206 defines supported connection types associated with particular addresses, virtual local area networks or switch ports. A flow may be defined as all packets that match a particular header format. Each entry 211 in the flow table 206 can include one or more rules 212, actions 214, and statistics 216 associated with a particular flow. The rules 212 define each flow and can be determined by packet headers. The actions 214 define how packets are processed. The statistics 216 track information such as the size of each flow (e.g., number of bytes), the number of packets for each flow, and time since the last matching packet of the flow or connection time. Examples of actions include instructions for forwarding packets of a flow to one or more specific ports 210a-210n (e.g., unicast or multicast), encapsulating and forwarding packets of a flow to the network controller 112 of FIG. 1, and dropping packets of the flow. Entries 211 in the flow table 206 can be added and removed by the network controller 112 of FIG. 1 via the secure channel 204. The network controller 112 of FIG. 1 can pre-populate the entries 211 in the flow table 206. Additionally, the switch 106 can request creation of an entry 211 from the network controller 112 upon receiving a flow without a corresponding entry 211 in the flow table 206.

The buffers 208a-208n provide temporary storage in queues for flows as packets are sent between the ports 210a-210n. In a lossless configuration, rather than dropping packets when network congestion is present, the buffers 208a-208n temporarily store packets until the associated ports 210a-210n and links 105 of FIG. 1 are available. Each of the buffers 208a-208n may be associated with a particular port, flow, or sub-network. Each of the buffers 208a-208n is logically separate but need not be physically independent. Accordingly, when one of the buffers 208a-208n is full, it does not adversely impact the performance of the other buffers 208a-208n within the switch 106.

Figure 3:
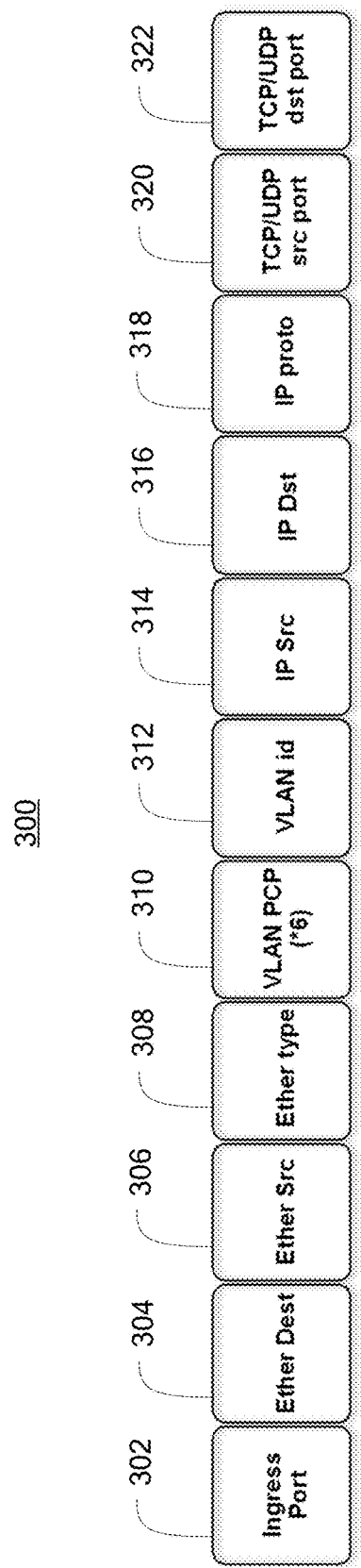
FIG. 3 depicts an example of an OpenFlow flow switching definition that can be used in embodiments.

FIG. 3 depicts an example of an OpenFlow flow switching definition 300 that can be used in embodiments. The OpenFlow flow switching definition 300 is an example flow header that includes up to eleven tuples or fields; however, not all tuples need to be defined depending upon particular flows. In the example of FIG. 3, the OpenFlow flow switching definition 300 includes tuples for identifying an ingress port 302, an Ethernet destination address 304, an Ethernet source address 306, an Ethernet type 308, a virtual local area network (VLAN) priority 310, a VLAN identifier 312, an Internet protocol (IP) source address 314, an IP destination address 316, an IP protocol 318, a transmission control protocol (TCP)/user datagram protocol (UDP) source port 320, and a TCP/UDP destination port 322. The Ethernet destination address 304 may represent a layer-2 Ethernet hardware address or media access control (MAC) address used in legacy switching and routing. The IP destination address 316 may represent a layer-3 IP address used in legacy switching and routing. Flow switching can be defined for any combination of tuples in the OpenFlow flow switching definition 300, with a particular combination of tuples serving as a key. For example, flows can be defined in a rule 212 of FIG. 2 by exact matching or wildcard matching for aggregated MAC-subnets, IP-subnets, ports, VLAN identifiers, and the like.

Figure 4:
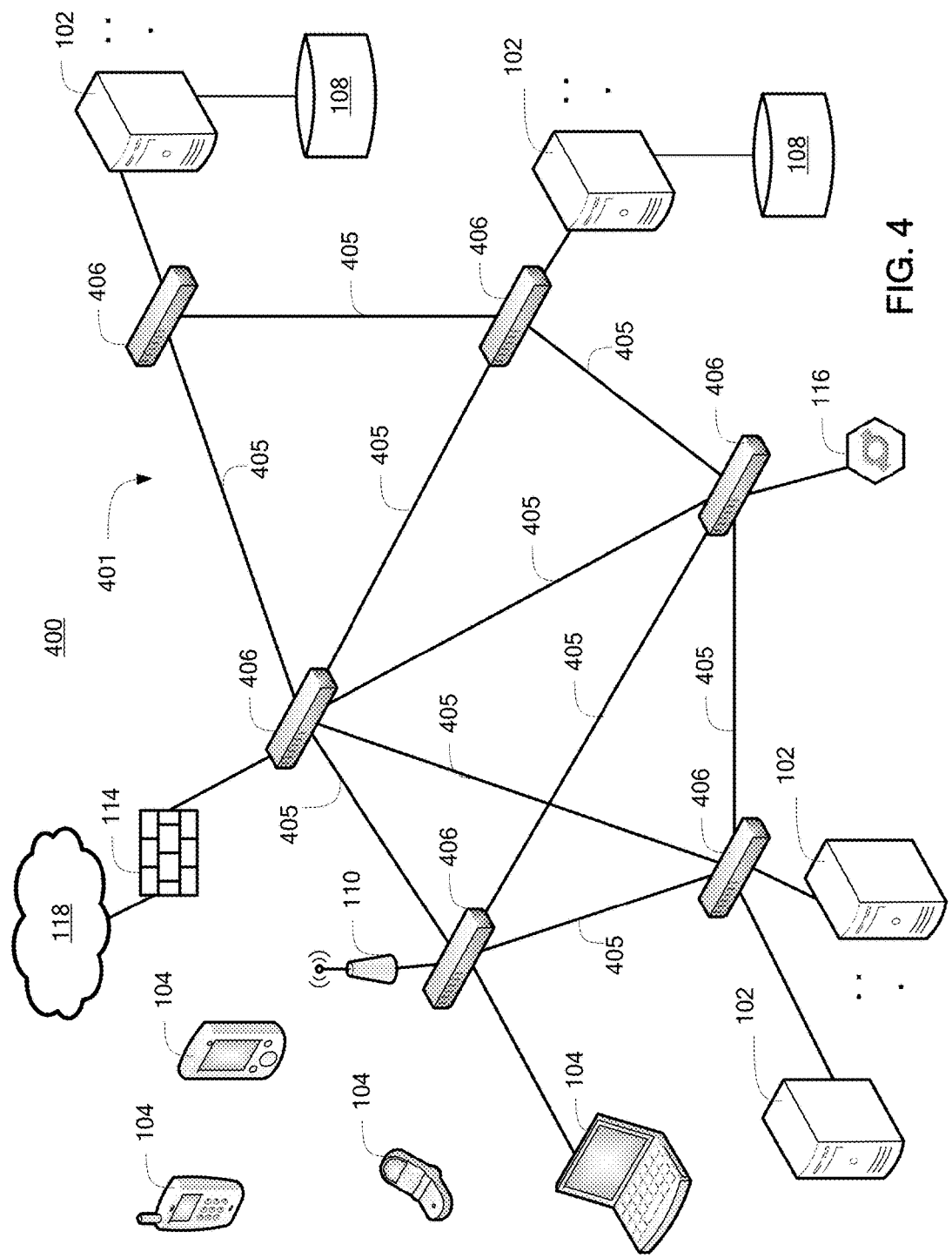
FIG. 4 depicts a block diagram of a system including a network of switches that may be implemented according to an embodiment.

FIG. 4 depicts a block diagram of a system 400 including a network 401 of switches 406 that may be implemented according to an embodiment. Similar to the system 100 of FIG. 1, the system 400 includes a plurality of servers 102 and client systems 104 configured to communicate over links 405 in the network 401 of switches 406. In contrast to the system 100 of FIG. 1, the switches 406 are not OpenFlow-capable. The client systems 104 can be linked directly to one or more of the switches 406 or wirelessly through one or more wireless access points 110. Also similar to the system 100 of FIG. 1, the system 400 includes a plurality of data storage systems 108, one or more load balancers 116, and one or more firewalls 114 to control access to one or more external networks 118.

Rather than include a separate network controller, such as the network controller 112 of FIG. 1, control and routing aspects are handled by one or more of the servers 102, clients 104, or the switches 406. Accordingly, the switches 406 need not include the secure channel 204 of FIG. 2 when control logic is localized within the switches 406. In exemplary embodiments, switches 106 of FIG. 1 and the switches 406 of FIG. 4 support dynamic port type detection as further described herein.

Figure 5:
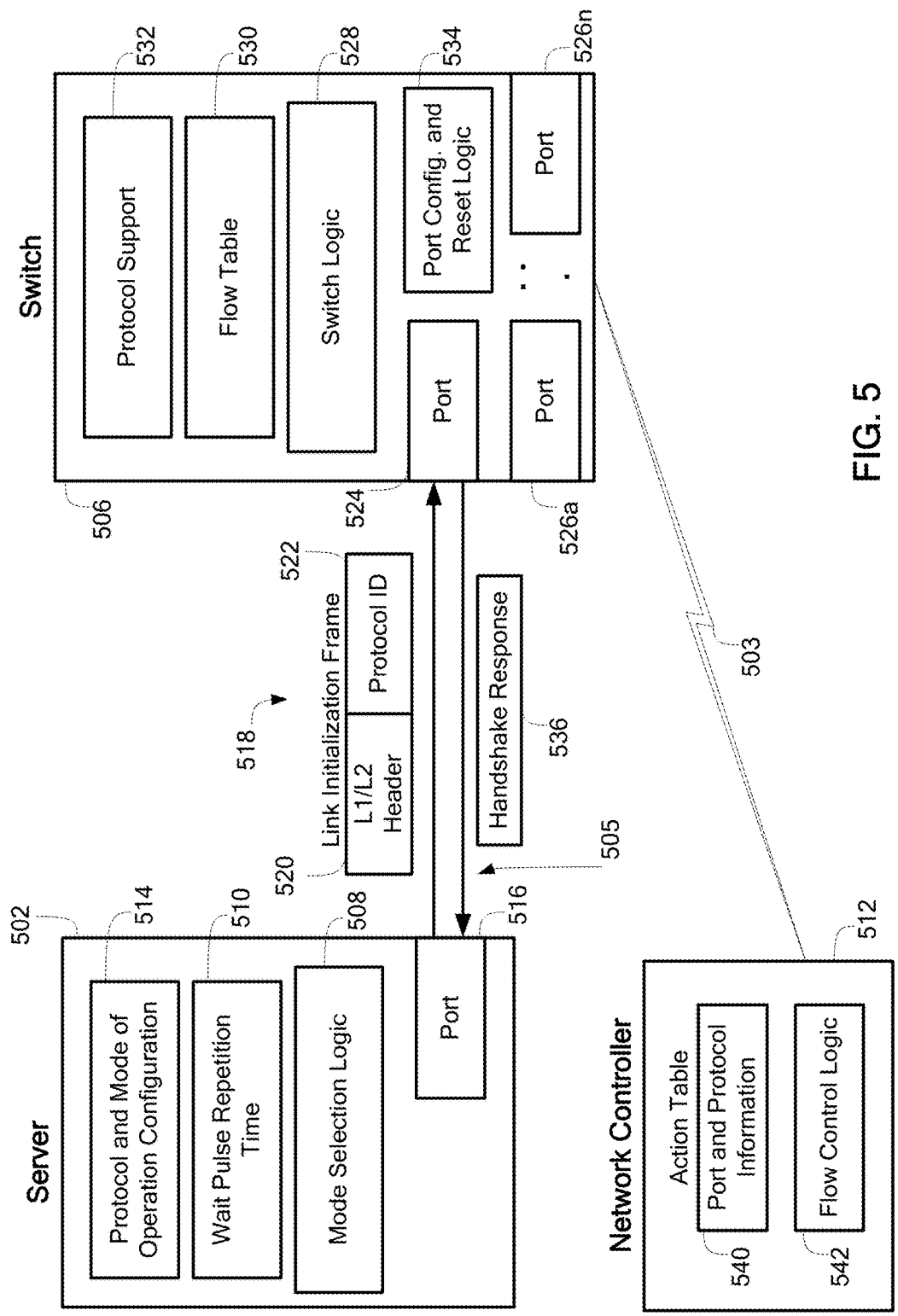
FIG. 5 depicts a block diagram to implement an initialization protocol for dynamic port type detection according to embodiments.

FIG. 5 depicts a block diagram to implement an initialization protocol for dynamic port type detection according to embodiments. A server 502 is coupled by a link 505 to a switch 506. The server 502 is an embodiment of the servers 102 of FIGS. 1 and 4. The switch 506 is an embodiment that may represent one of the switches 106 of FIG. 1 or one of the switches 406 of FIG. 4. A network controller 512 may be linked to the switch 506 by a secure link 503 in OpenFlow-capable embodiments, where the network controller 512 is an embodiment of the network controller 112 of FIG. 1. In non-OpenFlow embodiments, functions of the network controller 512 can be integrated into the server 502 or the switch 506.

In exemplary embodiments, the server 502 includes mode selection logic 508, wait pulse repetition time 510, protocol and mode of operation configuration 514, and at least one port 516. The mode selection logic 508 can be implemented in instructions stored in a computer readable storage medium for execution by a processing circuit or in hardware circuitry to send a link initialization frame 518 including a level-one and/or level-two header 520 and a protocol identifier 522 on port 516 across link 505 to port 524 of the switch 506. The wait pulse repetition time 510 provides a timing function for periodically sending the link initialization frame 518 to the switch 506. The protocol and mode of operation configuration 514 includes protocol formatting information for a number of supported modes of operation, an identified default mode of operation, maximum data rates per protocol, and protocol-to-port assignments. Example supported protocols include, but are not limited to, Ethernet, Fibre Channel, Fibre Channel over Ethernet (FCoE), Internet Wide Area Remote direct memory access Protocol (iWARP), and Remote direct memory access over Converged Ethernet (RoCE).

Similar to the switch 106 of FIG. 2, switch 506 includes switch logic 528, flow table 530, protocol support 532, and one or more other ports 526a-526n. When implemented as an OpenFlow switch, the switch 506 also includes a secure channel (not depicted) for communicating with the network controller 512 on secure link 503. The switch logic 528 is an embodiment of switch logic 202 of FIG. 2 and can be implemented in instructions stored in a computer readable storage medium for execution by a processing circuit or in hardware circuitry. Similarly, the flow table 530 is an embodiment of the flow table 206 of FIG. 2; the protocol support 532 is an embodiment of the protocol support 205 of FIG. 2; and the ports 524 and 526a-526n are embodiments of the ports 210a-210n of FIG. 2.

The switch 506 also includes port configuration and reset logic 534. The port configuration and reset logic 534 can change the configuration of the ports 524 and 526a-526n based on a requested mode of operation and reset reconfigured ports for the configuration changes to take effect. Port reset requests can flow internally within the switch 506 or be received from the server 502 or the network controller 512. When the switch logic 528 successfully decodes the protocol identifier 522 as identified in protocol support 532, the port configuration and reset logic 534 can reconfigure the port 524 to a mode of operation compatible with the protocol identifier 522. The flow table 530 is updated to configure one or more other ports 526a-526n of the switch 506 to the mode of operation compatible with the protocol identifier 522. The switch logic 528 sends a handshake response 536 to acknowledge the successful decoding of the protocol identifier 522.

The network controller 512 includes an action table 540 that holds port and protocol information for the switch 506, as well as rules, actions, and statistics for flows through the switch 506 and other switches, such as switches 106 of FIG. 1. The network controller 512 also includes flow control logic 542 that can be implemented in instructions stored in a computer readable storage medium for execution by a processing circuit or in hardware circuitry. The network controller 512 can manage updates of the flow table 530 in the switch 506. Based on the updating of the flow table 530 in the switch 506, the port and protocol information in the action table 540 of the network controller 512 is updated to reflect the changes.

Figure 6:
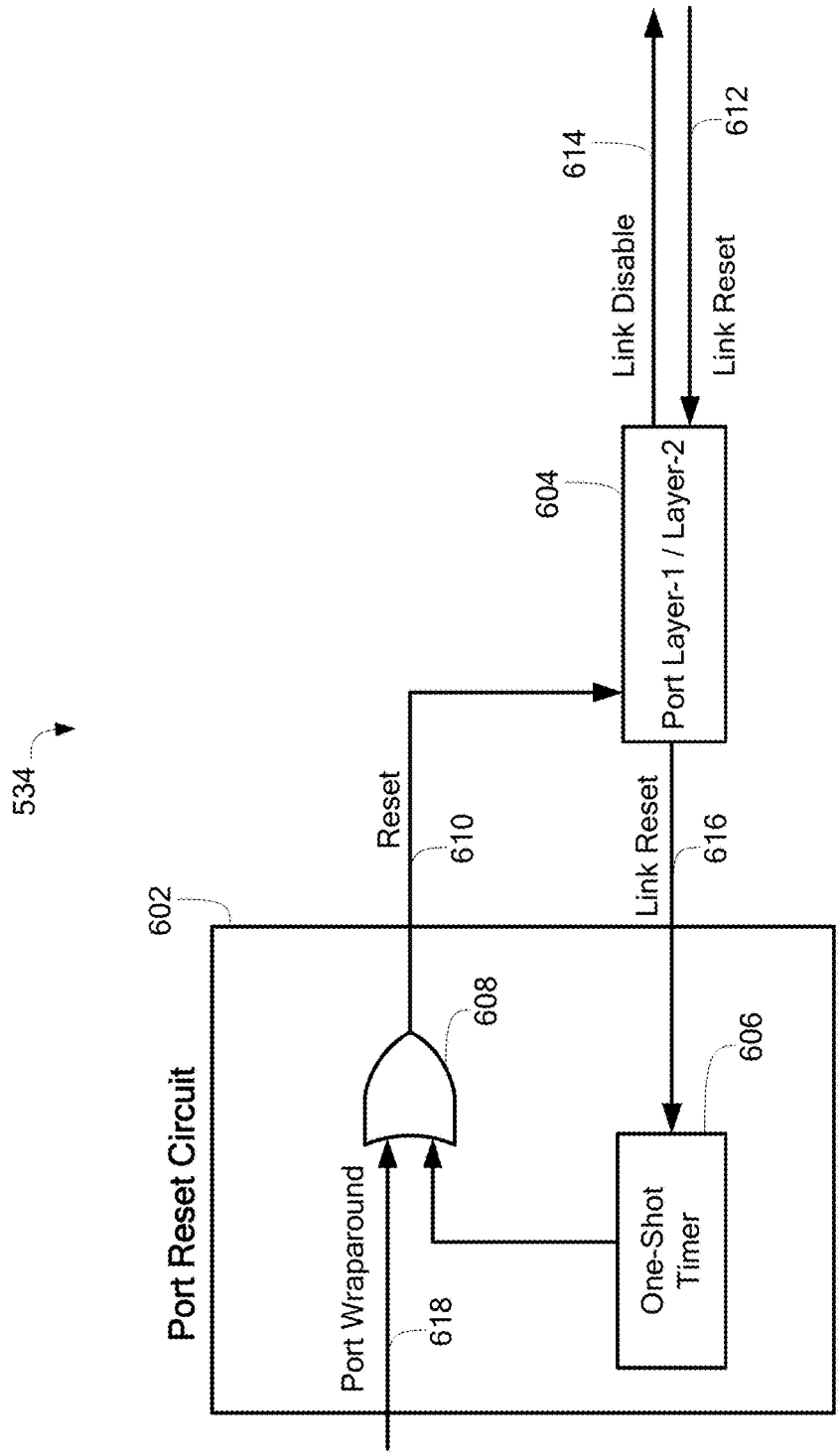
FIG. 6 depicts a block diagram of port reset logic according to an embodiment.

FIG. 6 depicts a block diagram of port reset logic of the port configuration and reset logic 534 of FIG. 5 according to an embodiment. A port reset circuit 602 interfaces with a port layer-one/layer-two interface 604 to reset one or more of the ports 524, 526a-526n as part of the port configuration/reconfiguration process. The port layer-one/layer-two interface 604 configures one or more of the ports 524, 526a-526n at a physical layer and/or link layer (e.g., MAC configuration). The port reset circuit 602 may include a one-shot timer 606 and an OR-gate 608 configured to send a reset signal 610 to the port layer-one/layer-two interface 604. A reset may be performed after mode of operation adjustments are made, such as a change in data rate. The port layer-one/layer-two interface 604 is configured to receive a link reset signal 612 and send a link disable signal 614. Based on receiving the link reset signal 612, the port layer-one/layer-two interface 604 sends a link reset signal 616 to the one-shot timer 606 to flow the reset to the OR-gate 608 and back to the port layer-one/layer-two interface 604 as reset signal 610, which may be output as link disable signal 614. The link disable signal 614 can be passed as a port wraparound signal to one or more other ports, which is detected as port wraparound signal 618 at other instances of the port configuration and reset logic 534 for other ports of the switch 506. The port wraparound signal 618 is a second input to the OR-gate 608 that can also result in sending the reset signal 610 to an associated port layer-one/layer-two interface 604.

Figure 7A:
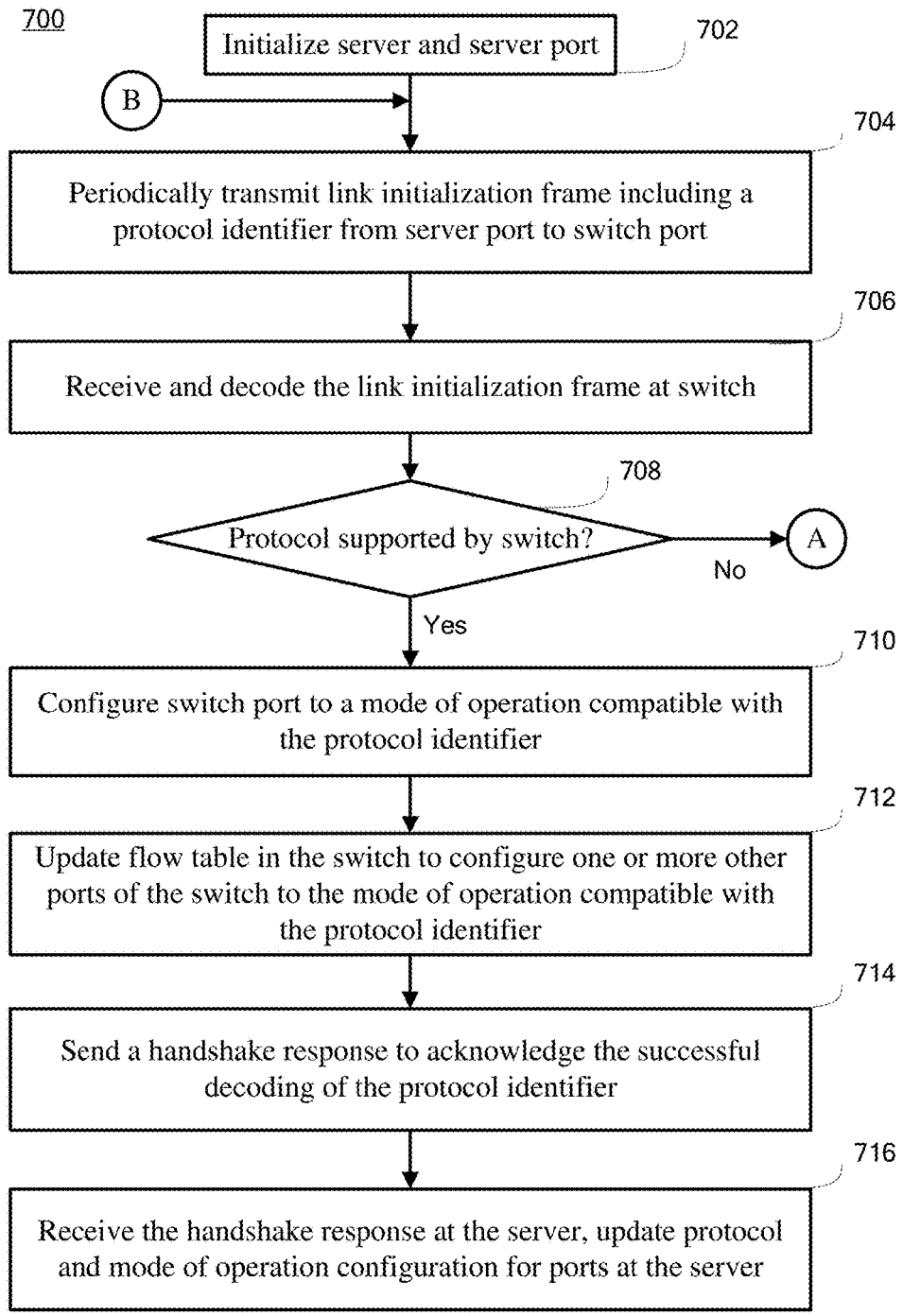
FIGS. 7A and 7B depict a flow diagram of a process for dynamic port type detection according to embodiments.
Figure 7B:
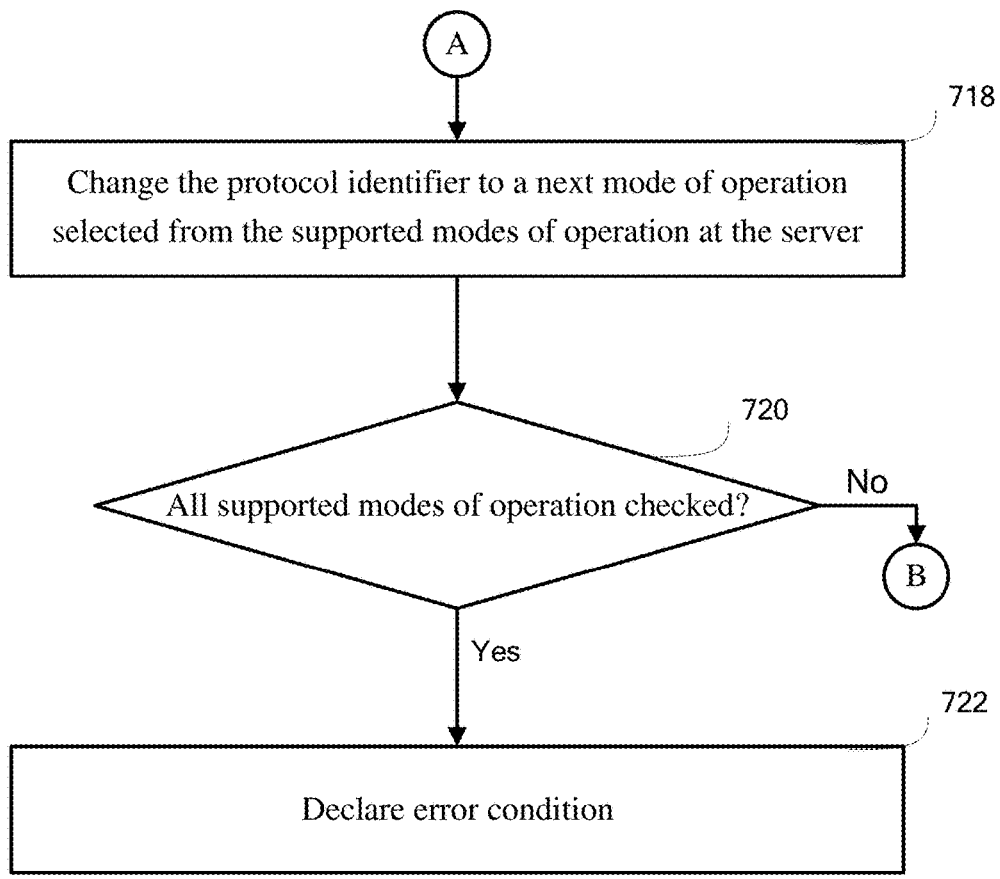

Turning now to FIGS. 7A and 7B, a flow diagram of a process 700 for dynamic port type detection will be described in an exemplary embodiment. The process 700 is described in reference to FIGS. 1-6 and can be implemented by the system 100 of FIG. 1 and/or the system 400 of FIG. 4.

At block 702, the server 502 is initialized. Initialization can include setting a default mode of operation for the link 505 at the server 502 upon server initialization, setting the wait pulse repetition time 510 at the server 502, and setting a number of supported modes of operation at the server 502. The default mode of operation, a reset value for the wait pulse repetition time 510, and the number of supported modes of operation can be read from the protocol and mode of operation configuration 514. A protocol identifier to send as protocol identifier 522 can be set based on the default mode of operation (e.g., Ethernet) prior to transmitting the link initialization frame 518.

At block 704, the mode selection logic 508 periodically transmits the link initialization frame 518 from the server 502 through the link 505 to the switch 506 upon link initialization. The link initialization frame 518 may be sent at the physical layer (layer-one) and/or link layer (layer-two) between ports 516 and 524 such that higher level protocols (e.g., layer-three and higher) are not used for sending and decoding the link initialization frame 518.

At block 706, the switch 506 receives the link initialization frame 518 at port 524 as a level-one or level-two message. At block 708, the switch logic 528 checks the protocol support 532 to determine whether the protocol identifier 522 maps to a mode of operation of the switch 506, where the mode of operation is associated with a maximum data rate.

At block 710, based on successfully decoding the protocol identifier 522, the port 524 is configured by the port configuration and reset logic 534 to a mode of operation compatible with the protocol identifier 522. Configuring the port 524 may include resetting one or more of the physical layer and the link layer to configure the port of the switch based on one or more of: receiving a link reset request 612 at the port 524 and sending a link disable signal 614 from the port 524. The link disable signal 614 may be configured to wraparound from an output of the port 524 to a port wraparound 618 of a port reset circuit 602 at one or more other ports 526a-526n. Based on receiving the handshake response 536 at the server 502, the default mode of operation is updated for the link 505 to correspond with a most recent protocol identifier sent in a most recently acknowledged link initialization frame.

At block 712, the flow table 530 in the switch 506 is updated to configure the one or more other ports 526a-526n of the switch 506 to the mode of operation compatible with the protocol identifier 522.

At block 714, the switch logic 528 sends a handshake response 536 to acknowledge the successful decoding of the protocol identifier 522. Based on updating of the flow table 530 in the switch 506, the port and protocol information in the action table 540 of the network controller 512 is configured to control the switch 506.

At block 716, based on receiving the handshake response 536 at the server 502, configuration information in the protocol and mode of operation configuration 514 at the server 502 is updated to indicate that the port 524 of the switch 506 is set to the mode of operation compatible with the protocol identifier 522. The mode of operation establishes a highest permitted data rate for the link 505.

At block 718, based on failing to receive the handshake response 536 at the server 502 prior to expiration of the wait pulse repetition time 510, the protocol identifier 522 is changed to a next mode of operation selected from the supported modes of operation in the protocol and mode of operation configuration 514. The wait pulse repetition time 510 is reset, and the link initialization frame 518 is transmitted.

At block 720, based on failing to receive the handshake response 536 at the server 502 prior to expiration of the wait pulse repetition time 510, the process 700 returns to block 704 until the handshake response 536 is received or all of the number of supported modes of operation are checked. At block 722, if all of the supported modes of operation are checked without receiving the handshake response 536, an error condition is declared at the server 502.

Technical effects include handling initialization of ports to detect and select a protocol from multiple protocols for a link between a switch and a server. Upon establishing a protocol for the ports, a highest available data rate can be utilized.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A method for dynamic port type detection, comprising:
setting a default mode of operation for a link at a server upon server initialization;
setting a wait pulse repetition time at the server;
setting a number of supported modes of operation at the server;
setting a protocol identifier to the default mode of operation;
transmitting a link initialization frame comprising the protocol identifier to a port of a switch of a network;
based on failing to receive at the server a handshake response to acknowledge successful decoding of the protocol identifier from the switch prior to expiration of the wait pulse repetition time:
changing the protocol identifier to a next mode of operation selected from the supported modes of operation;
resetting the wait pulse repetition time;
transmitting the link initialization frame to the port of the switch; and
repeating the changing of the protocol identifier, the resetting of the wait pulse repetition time, and the transmitting of the link initialization frame until the handshake response is received or all of the number of supported modes of operation are checked.

2. The method of claim 1, wherein the link initialization frame is defined at one or more of a physical layer and a link layer.

3. The method of claim 2, further comprising:
resetting one or more of the physical layer and the link layer to configure the port of the switch based on one or more of: receiving a link reset request at the port and sending a link disable signal from the port, wherein the link disable signal is configured to wraparound from an output of the port to a port reset circuit.

4. The method of claim 1, further comprising:
based on updating a table in the switch, updating port and protocol information in a network controller configured to control the switch, wherein the table comprises a plurality of entries defining a plurality of packet routing paths for a plurality of flows within the network to forward a plurality of packets from at least one port of the switch to one or more other ports of the network based on a header format of the plurality of packets.

5. The method of claim 1, further comprising:
periodically transmitting the link initialization frame from the server through the link to the switch upon link initialization; and
based on receiving the handshake response at the server, updating configuration information at the server indicating that the port of the switch is set to a mode of operation compatible with the protocol identifier, wherein the mode of operation establishes a highest permitted data rate for the link.

6. The method of claim 1, further comprising:
based on receiving the handshake response at the server, updating the default mode of operation for the link to correspond with a most recent protocol identifier sent in a most recently acknowledged link initialization frame.

7. The method of claim 1, wherein the protocol identifier identifies a protocol selected from: Ethernet, Fibre Channel, Fibre Channel over Ethernet (FCoE), internet Wide Area Remote direct memory access Protocol (iWARP), and Remote direct memory access over Converged Ethernet (RoCE).

8. A system for dynamic port type detection, comprising:
a network controller;
a switch coupled to the network controller by a secure channel, the switch comprising a port coupled to a server by a link in a network; and
the server configured to perform a method comprising:
setting a default mode of operation for the link upon server initialization;
setting a wait pulse repetition time;
setting a number of supported modes of operation;
setting a protocol identifier to the default mode of operation;

transmitting a link initialization frame comprising the protocol identifier to the port of the switch of the network;

based on fading to receive a handshake response to acknowledge successful decoding of the protocol identifier from the switch prior to expiration of the wait pulse repetition time:

changing the protocol identifier to a next mode of operation selected from the supported modes of operation;

resetting the wait pulse repetition time;

transmitting the link initialization frame to the port of the switch; and repeating the changing of the protocol identifier, the resetting of the wait pulse repetition time, and the transmitting of the link initialization frame until the handshake response is received or all of the number of supported modes of operation are checked.

9. The system of claim 8, wherein the link initialization frame is defined at one or more of a physical layer and a link layer.

10. The system of claim 9, wherein the switch is configured to reset one or more of the physical layer and the link layer to configure the port of the switch based on one or more of receiving a link reset request at the port and sending a link disable signal from the port, wherein the link disable signal is configured to wraparound from an output of the port to a port reset circuit.

11. The system of claim 8, further comprising:

based on updating a table in the switch, a plurality of port and protocol information in the network controller is configured to control the switch, wherein the table comprises a plurality of entries defining a plurality of packet routing paths for a plurality of flows within the network to forward a plurality of packets from at least one port of the switch to one or more other ports of the network based on a header format of the plurality of packets.

12. The system of claim 8, wherein the server is configured to perform the method comprising:

periodically transmitting the link initialization frame from the server through the link to the switch upon link initialization; and based on receiving the handshake response at the server, updating configuration information at the server indicating that the port of the switch is set to a mode of operation compatible with the protocol identifier, wherein the mode of operation establishes a highest permitted data rate for the link.

13. The system of claim 8, wherein the server is further configured to perform:

based on receiving the handshake response at the server, updating the default mode of operation for the link to correspond with a most recent protocol identifier sent in a most recently acknowledged link initialization frame.

14. The system of claim 8, wherein the protocol identifier identifies a protocol selected from: Ethernet, Fibre Channel, Fibre Channel over Ethernet (FCoE), Internet Wide Area Remote direct memory access Protocol (iWARP), and Remote direct memory access over Converged Ethernet (RoCE).

15. A computer program product for dynamic port type detection, the computer program product comprising:

a non-transitory storage medium readable by a processing circuit and storing instructions for execution by the processing circuit for performing a method comprising:

setting a default mode of operation for a link at a server upon server initialization;

setting a wait pulse repetition time at the server;

setting a number of supported modes of operation at the server;

setting a protocol identifier to the default mode of operation;

transmitting a link initialization frame comprising the protocol identifier to a port of a switch of a network;

based on failing to receive at the server a handshake response to acknowledge successful decoding of the protocol identifier from the switch prior to expiration of the wait pulse repetition time:

changing the protocol identifier to a next mode of operation selected from the supported modes of operation;

resetting the wait pulse repetition time;

transmitting the link initialization frame to the port of the switch; and repeating the changing of the protocol identifier, the resetting of the wait pulse repetition time, and the transmitting of the link initialization frame until the handshake response is received or all of the number of supported modes of operation are checked.

16. The computer program product of claim 15, wherein the link initialization frame is defined at one or more of a physical layer and a link layer.

17. The computer program product of claim 15, further comprising:

periodically transmitting the link initialization frame from the server through the link to the switch upon link initialization; and based on receiving the handshake response at the server, updating configuration information at the server indicating that the port of the switch is set to a mode of operation compatible with the protocol identifier, wherein the mode of operation establishes a highest permitted data rate for the link.

18. The computer program product of claim 15, further comprising:

based on receiving the handshake response at the server, updating the default mode of operation for the link to correspond with a most recent protocol identifier sent in a most recently acknowledged link initialization frame.

19. The computer program product of claim 15, wherein the protocol identifier identifies a protocol selected from: Ethernet, Fibre Channel, Fibre Channel over Ethernet (FCoE), Internet Wide Area Remote direct memory access Protocol (iWARP), and Remote direct memory access over Converged Ethernet (RoCE).

* * * * *